United States Patent [19]
O'Neill

[11] 4,069,812
[45] Jan. 24, 1978

[54] SOLAR CONCENTRATOR AND ENERGY COLLECTION SYSTEM

[75] Inventor: Mark J. O'Neill, Dallas, Tex.

[73] Assignee: E-Systems, Inc., Dallas, Tex.

[21] Appl. No.: 752,688

[22] Filed: Dec. 20, 1976

[51] Int. Cl.² .............................. F24J 3/02; G02B 3/08
[52] U.S. Cl. ..................................... 126/271; 350/211; 126/270
[58] Field of Search ............... 126/270, 271; 237/1 A; 350/211

[56] References Cited

U.S. PATENT DOCUMENTS

| 1,504,970 | 8/1924 | Pascucci | 350/211 |
| 3,125,091 | 3/1964 | Sleeper, Jr. | 350/211 X |
| 3,523,721 | 8/1970 | Hofmann | 350/211 |

FOREIGN PATENT DOCUMENTS

| 902,535 | 8/1962 | United Kingdom | 350/211 |

*Primary Examiner*—Kenneth W. Sprague
*Attorney, Agent, or Firm*—Robert V. Wilder

[57] ABSTRACT

A curved prismatic, Fresnel-type lens primarily used for concentrating sunlight in a solar energy collector. The lens comprises a substantially smooth, convex outer surface and a plurality of prisms arranged side-by-side along a curve on the inner surface to direct incoming light to a common area. Each of the individual prisms has a front and back face joined by a bottom face. The front and back faces of the prisms are oriented such that the angle of incidence of the incoming light with the front face is equal to the angle of incidence of the outgoing light with the back face. Further, each of the prisms is arranged along the curve such that they do not obstruct light passing through any adjacent prism. The bottom face of each prism is over-extended beyond the path of the light passing through the prism to prevent loss of light due to blockage by the bottom face or the rounded point between the back face and bottom face. The improved lens is used in combination with a solar energy collector comprising the improved concentrator and a suitable energy receiver for converting incident sunlight into a useful energy output.

40 Claims, 14 Drawing Figures

SOLAR CONCENTRATOR AND ENERGY COLLECTION SYSTEM

BACKGROUND

Heretofore, Fresnel lenses have been of two types, a flat type and a curved convex type. A three-dimensional or spherical Fresnel lens is designed to focus on a point, and a two-dimensional or cylindrical lens is designed to focus on a line.

Previously, Fresnel lenses have been primarily designed for use with a point source of light to create a wide collimated beam of light such as those used in a lighthouse or studio stagelight.

An example of the beam focusing lens is disclosed in the patent to Pascucci, U.S. Pat. No. 1,504,970, which discloses a Fresnel lens having on one face concentric zones united by miters, the miters being cut whereby they are parallel to the path of the rays passing through the lens. The juncture of the miters between the bottom face and the rear face of the prism is assumed to be a perfectly pointed configuration. However, in the manufacture of these types of lenses out of material such as glass or acrylic plastics the surface tension of the material placed in the mold at the juncture of these faces will cause the point to be rounded. If the mitered face is constructed, as taught by Pascucci, and aligned parallel to the path of the rays, and if the lens is used to focus sunlight, the rounded point will cause divergence of the light rays along that portion away from the focal point as the light passes through the prism. In addition, errors occur in manufacturing the prisms and in aiming of the lens toward the sun. These errors will cause a portion of the light to intercept the bottom face and thus refract away from the focal point. The loss due to light striking the rounded corner and bottom face could be anywhere from 20% when the lens is glass to 5 to 10% when the lens is an extruded plastic type lens.

Fresnel lenses have been used in solar collectors as disclosed by the patent to Sleeper, U.S. Pat. No. 3,125,091, which discloses an inflatable cylindrical type lens having prisms formed therein.

Prisms in the Sleeper patent are superimposed on a circular arc which imposes restrictions on the optical efficiency of this type of lens. The light passing through the edges of this type of circular lens is so severely deflected that it is completely lost. In addition, the Sleeper collector teaches a flexible type solar collector which is incapable of reaching high temperatures and withstanding exterior weather conditions for 20 years or more.

Heretofore, most prior art Fresnel lenses had longer focal lengths with F-numbers of 1.0 or greater. This required more material, more insulation and a greater volumne of space to construct the lens and solar collector to collect the proper amount of heat. Furthermore, much of the material content (and thus the cost) of the collector is due to the housing and structural support system, which can be greatly reduced by reducing the lens focal length to make a more compact collector unit. Unfortunately, conventional Fresnel-type lenses suffer great losses in transmittance as the focal length is reduced. This is the reason that prior-art Fresnel lens collectors have utilized long focal length lenses with F-Numbers (focal length divided by lens width) of 1.0 or greater.

It should be readily apparent that solar collectors must be highly efficient in order to utilize the full potential of converting the sun's energy into a useful form of energy. The loss of 10 or 20% of the energy transmitted through the lens is often times critical as to whether the system may be used for merely heating purposes or for conversion of light into energy useful for air conditioning, generation of electricity, or other processes. In the past, the flat plate collectors have been used due to the simplicity of construction. However, flat plate collectors need a large area and a large heat absorber, and have very low collection efficiencies. Heat absorbers are often constructed from stainless steel or copper to minimize corrosion and are therefore extremely expensive to manufacture.

Fresnel lenses in use now have a high loss of light transmittance through the lens due primarily to reflections at the prism surfaces. This high reflection loss causes a large decrease in collection efficiency.

Therefore, it is highly desirable to produce a solar concentrator which has the highest transmittance and the shortest possible focal length. Such a concentrator will achieve the highest collection efficiency at minimum cost. The new concentrator described below has these beneficial characteristics.

SUMMARY

I have devised a new curved prismatic Fresnel-type lens for use in a solar energy collector. Generally, the collector comprises a housing of insulating material having an energy receiver positioned at the bottom of the housing and the prismatic lens secured across the open top of the housing to direct light toward the energy receiver which may be a heat absorber or other device such as a photovoltaic cell.

The lens comprises a substantially smooth, convex outer surface having a plurality of prisms arranged side by side along the curved inner surface of the lens to direct the parallel incoming sunlight to a common area or target coinciding with the energy absorber.

Each of the individual prisms has a front and back face joined by a bottom face. The front and back faces of the prisms are oriented on each prism such that the angle of incidence of the incoming light on the front face of the prism is equal to the angle of incidence of the outgoing light on the back face of the prism. The equal angles of incidence minimize the reflection loss of the light components and therefore affords the highest transmittance of light through each of the prisms and therefore through the lens. Each prism is further arranged so as not to block the light passing through the adjacent prism, and the bottom face of each prism is over extended to a position beyond the path of light passing within the prism to a position short of the path of the light passing out of adjacent prisms to compensate for aiming errors and rounded points between the bottom and back faces of the prism.

The lens has a higher light transmittance than any other lens with the same F-number and material composition. The lens can be designed with an F-number (focal length divided by width) of significantly less than 1.0 such that the overall depth of the units is thus minimized to reduce the materials needed to build the collectors. The shorter focal length of the lens reduces the effect of errors in aiming. The lens is capable of use in a line-focus collector to produce temperatures of up to 500° F, and can be designed in a point-focus collector to produce temperatures up to 1,000° F.

The primary object of the invention is to produce a prismatic lens for use in solar collectors which minimizes reflective losses as the light passes through the individual prisms of the lens thereby maximizing transmittance of light therethrough.

A further object of the invention is to provide a prismatic type lens having a high efficiency and which has a shorter focal length capable of having F-numbers less than 1.0.

A still further object of the invention is to produce a collector which is capable of producing the maximum amount of energy for a minimal amount of space and which is lightweight for use on roofs without excessively loading the support structure and which is capable of producing a highly efficient energy collection device.

A still further object of the invention is to produce a lens having individual prisms which are over extended beyond the path of light within said prisms to reduce the effect of errors in manufacturing the lens and in aiming the lens toward the sun, and to prevent light losses due to blockage by the rounded point between the back and the bottom face of the prisms.

A still further object of the invention is to provide an energy collector which maximizes energy concentration along an energy receiver by a lens constructed of prisms having front and back surfaces which have equal angles of incidence with the light passing therethrough.

Other and further objects of the invention will become apparent upon referring to the detailed description hereinafter following and by referring to the drawings annexed hereto.

DESCRIPTION OF DRAWINGS

Drawings of preferred embodiments of the invention are annexed hereto so that the invention may be better and more fully understood, in which.

DESCRIPTION OF A PREFERRED EMBODIMENT

Figure 1:
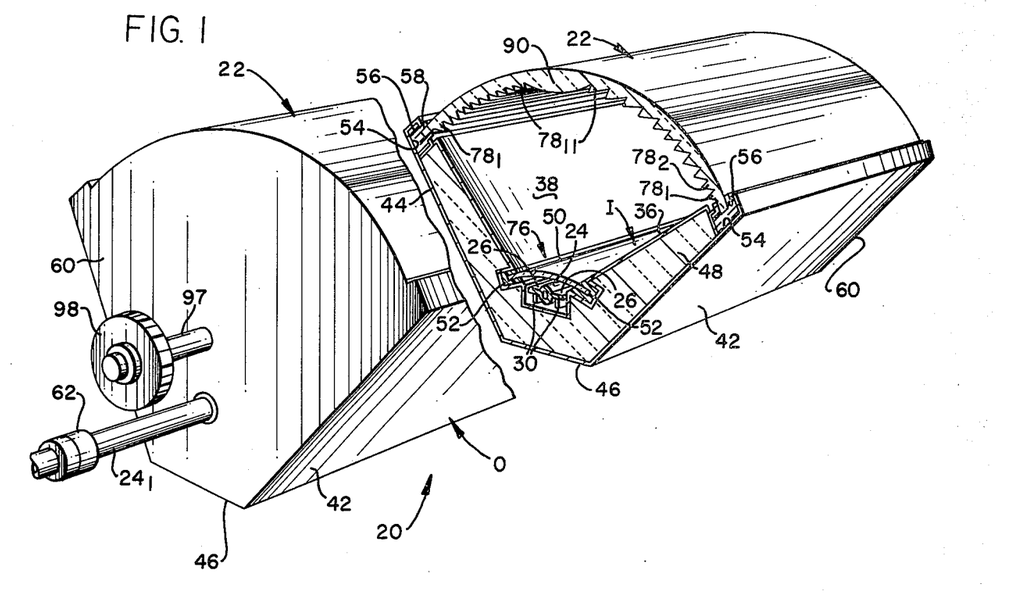
FIG. 1 is a perspective view with parts broken away to more clearly illustrate the details of construction of the collector.
Figure 2:
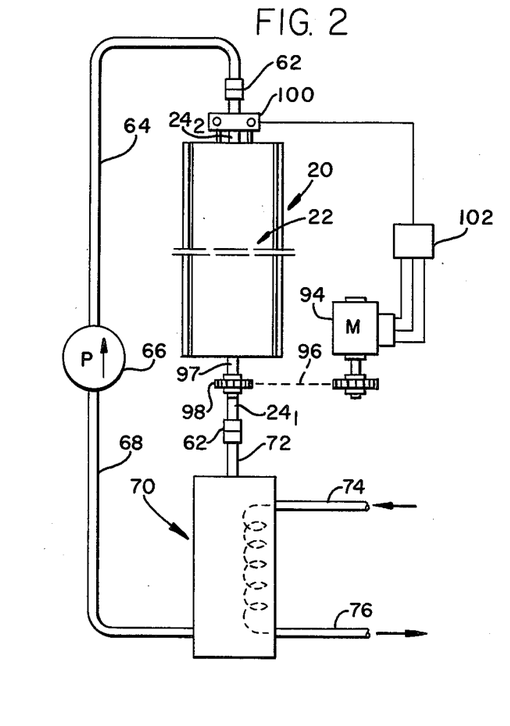
FIG. 2 is a diagrammatic view illustrating a typical solar concentrator.

Referring to FIGS. 1 and 2 of the drawings, the collector 20 is utilized to concentrate light energy by use of a prismatic linear lens 22. The linear lens 22 directs the incoming sunlight to a common focal area 76 generally lying in the focal plane of the linear lens 22. It is general practice to use an energy receiving means which coincides with the common focal area of linear lens 22 to convert light energy to heat for various uses. In a solar collector the energy receiving means is generally an absorber such as the one illustrated in FIGS. 1 and 3 comprising a hollow elongated tube 24 having fins 26 diametrically secured thereto which may be coated with dark coating such as chrome black to more efficiently absorb sunlight. Tube 24 has a passage 28 through which a heat exchange medium flows to absorb heat.

Figure 3:
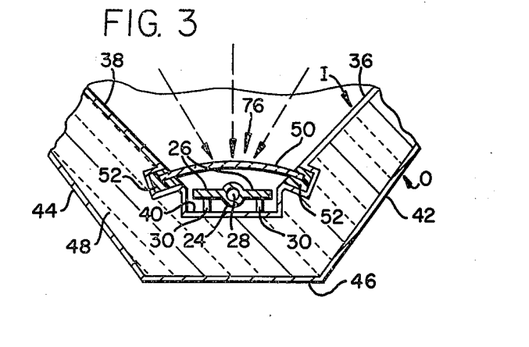
FIG. 3 is an enlarged cross-sectional view of the energy receiver.

The tube 24 may be resting on spacers 30 which space the tube 24 off of the interior housing. The housing comprises a generally truncated V-shaped inner housing I having sidewalls 36 and 38 which are joined by an inner bottom 40 which are spaced from outer housing walls 42 and 44 and bottom 46. A layer of thermal insulation 48 is positioned between the inner housing I and outer housing O to prevent transfer of heat away from the energy receiving means. The insulation 48 may be fiberglass or some other suitable type. A clear, concaved transparent cover 50 is positioned over the upper side of tube 24 in longitudinal passages 52 formed in the lower end of sidewalls 36 and 38 to decrease heat loss from the receiver tube 24.

A C-shaped channel 54 is formed at the upper end of the outer housing sidewall 42 and 44 and joined with the inner housing sidewalls 36 and 38, respectively, to connect the tops together. The channel 54 runs longitudinally along the sidewalls of the collector 20. A resilient gasket 56 having a slot 58 for receiving the edges of lens 22 is disposed longitudinally in C-shaped channel 54. The gasket 56 provides a weather tight seal to protect the collector 20 interior from rain, dust and corrosion. End panels 60 are positioned across each end of the inner housing sidewalls 36 and 38 and outer housing sidewalls 44 and 42 to seal and insulate the collector 20. Tube $24_1$ passes outwardly from the lower end of end panels 60. Tube $24_1$ can be a flexible hose to allow the collector 20 to rotate with sprocket 98 to track the sun.

As best illustrated in FIG. 2, the connection 62 on the end of tube $24_2$ is attached to pipe 64 which is connected to the outlet of pump 66. The pipe 68 is connected between the inlet of pump 66 and the outlet of heat exchanger 70 having an inlet. Pipe 72 is connected between the inlet of exchanger 70 and flexible tube $24_1$. A heat exchange medium is pumped through pipe 64 and 68 and through tube 24 of collector 20 for heating the heat exchanger 70. Heat exchanger 70 has an inlet pipe 74 and an outlet pipe 76 through which another heat exchange medium is passed for connection to apparatus to use the solar heat collected for air conditioning or other applications. It should be readily apparent that various types of arrangements for using the heated medium are possible and are well known in the art and the embodiment shown in FIG. 2 is merely an example of such an arangement. A typical heat exchange medium is water. The axis of rotation of the collector will usually be parallel to the Earth's polar axis to facilitate tracking.

Figure 8:
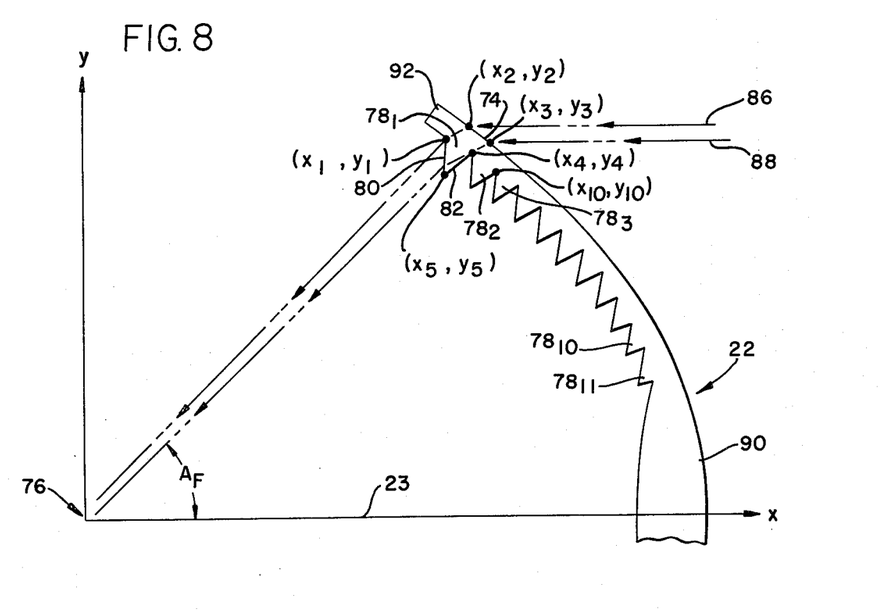
FIG. 8 is a partial end elevational view of the lens disconnected from the collector.
Figure 9:
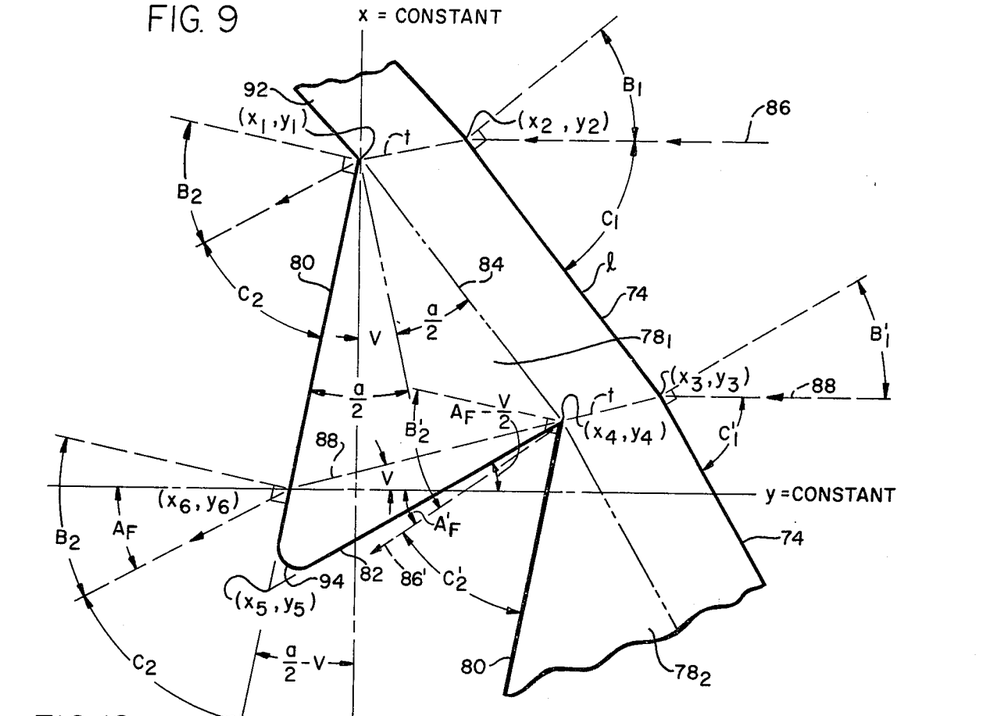
FIG. 9 is an enlarged end view of the left outermost prism of the lens illustrated in FIG. 8.

As best illustrated in FIGS. 1, 8, and 9, the prismatic linear lens 22 comprises a curved outer surface formed by the front face 74 of a plurality of prisms 78. Prisms 78 are arranged as shown in FIG. 8 from the outer most prism $78_1$ to the innermost prism $78_{11}$. The prisms 78 are arranged to focus the light to a common focal area 76 which corresponds to the intersection of the X-Y axes. The inner surface of the lens 22 is defined by the remaining surfaces of the plurality of prisms $78_1$-$78_{11}$ each of which has the front face 74 corresponding to the outer surface of the lens, a back face 80 and a bottom face 82 to form a linear prism element 78 which has a substantially truncated triangular cross-section as best illustrated in FIG. 9. As illustrated in FIG. 9, the prism base line 84 shown in dashed outline is parallel to the front face 74 of lens 22 and has an equal length thereto. It should be readily apparent that the curved outer surface of the lens may be comprised of short, straight sections of front face 74 which give the appearance of the curved surface. The length of surfaces 74 is ideally minimized to be as short as practical and may in reality be actually curved in the construction of lens.

The front face 74 is positioned at an angle $B_1$ with the incoming parallel rays 86 and 88 of sunlight diagrammatically illustrated by dashed lines in FIGS. 8 and 9. Each prism 78 is oriented such that the incidence angle $B_1$ with the incoming light relative to the front face 74 is equal to the angle of incidence $B_2$ formed by the outgoing sunlight relative to the back face 80 of the prism 78 such that eacn prism 78 is oriented along the inner surface of the lens 22 to refract the light at a specified turning angle $A_F$, this angle being an angle between the axis 23 of lens 22 and the ray of light 88, to orient the light passing through each of the prisms $78_1$ - $78_{11}$ to a common focal area 76 which preferably coincides with the upper surface of the energy receiving means. The equal angles of incidence $B_1$ and $B_2$ of the sunlight with the front face 74 and back face 80 as it passes therethrough each prism 78 provide for a maximum light transmittance and therefore maximum efficiency of the lens 22 and collector 20.

The second prism $78_2$ has a turning angle $A'_F$ which is slightly less than $A_F$. The angles of incidence $B_1'$ and $B_2'$ with front face 74 and back face 80 are equal but the angles have a different value from the angles of incidence $B_1$ and $B_2$. It should be readily apparent that each set of angles change for each prism $78_1$ - $78_{11}$ in order to maximize the transmittance of light therethrough.

In the center of lens 22 where the prisms become small it is preferable to provide a double convex linear lens 90 which is oriented perpendicular to the axis 23 of lens 22. A substantially rectangular edge 92 is provided adjacent the outermost prisms $78_1$ which fits into slot 58 of gasket 56.

Lens 22 is symmetrical about the axis 23 and therefore the second half of lens 22 is a mirror image of the first half shown in FIG. 8.

As best illustrated in FIG. 9, the tip 94 of each prism 78 of lens 22 is slightly rounded due to the fact that the lens is molded of transparent material such as glass or acrylic in which the surface tension of the material as it cures causes tip 94 to round off where it is joining surfaces 80 and 82. Therefore the tip 94 will not be perfectly pointed as illustrated by the dashed outline for construction purposes only.

As will be more fully explained hereinafter, the design of this lens allows for the maximum transmittance T of energy through the lens while allowing focal lengths of the lens 22 to be designed having an F-number in the range of slightly negative to positive infinity. The lens 22 has a design such that an F-number of 1.0 or less may be produced while maintaining transmittance levels of light about 90%. F-number is herein defined as focal length divided by lens width, for example, $x_1/2y_1$, for the lens of FIG. 8, wherein the focal length is the distance between the focal point and an imaginary chord passing from one edge of the lens to the other, such chord passing perpendicularly through the axis 23.

It should be readily apparent that in actual usage the prisms 78 would be much smaller and more numerous than shown in FIG. 8, to conserve material and to maintain a light weight lens.

In order to prove that maximum transmittance occurs when angle $B_1$ = angle $B_2$ relative to the respective front face 74 and back face 80, I have formulated the following proof:

Consider the refraction phenomenon for an individual prism, wherein:

$B_1$ = the angle of incidence at the first prism face,
$B_2$ = the angle of incidence at the second prism face,
$A_F$ = the total turning angle of the light ray,
n = the prism material index of refraction.

From Snell's law, one can show that: (1) $A_F$ = $B_1$ - $\sin^{-1}(\sin B_1/n)$ + $B_2$ - $\sin^{-1}(\sin B_2/n)$. For a thin Fresnel lens made of non-absorbing material, such as acrylic plastic, light absorption losses will be small compared to light reflection losses. Furthermore, for non-polarized light such as solar radiation, one can show from basic electromagnetic theory that the single-surface reflectances for the prism are governed by the following equations:

$$P_1 = \frac{\sin^2[B_1 - \sin^{-1}(\sin B_1/n)]}{2\sin^2[B_1 + \sin^{-1}(\sin B_1/n)]} + \frac{\tan^2[B_1 - \sin^{-1}(\sin B_1/n)]}{2\tan^2[B_1 + \sin^{-1}(\sin B_1/n)]}, \quad (2)$$

$$P_2 = \frac{\sin^2[B_2 - \sin^{-1}(\sin B_2/n)]}{2\sin^2[B_2 + \sin^{-1}(\sin B_2/n)]} + \frac{\tan^2[B_2 - \sin^{-1}(\sin B_2/n)]}{2\tan^2[B_2 + \sin^{-1}(\sin B_2/n)]}, \quad (3)$$

wherein $P_1$ = the reflectance at the first prism face, and wherein $P_2$ = the reflectance at the second prism face. The overall prism transmittance (T) is: (4) T = $(1-P_1)(1-P_2)$, assuming no light absorption within the prism. When T is maximized, its differential should vanish:

$$dT = (1 - P_2)\frac{d(1 - P_1)}{dB_1} dB_1 + (1 - P_1)\frac{d(1 - P_2)}{dB_2} dB_2 = 0. \quad (5)$$

For a fixed, desired value of $A_F$, equation (1) can be differentiated to yield:

$$dB_1\left[1 - \frac{d[\sin^{-1}(\frac{\sin B_1}{n})]}{dB_1}\right] = -dB_2\left[1 - \frac{d[\sin^{-1}(\frac{\sin B_2}{n})]}{dB_2}\right]. \quad (6)$$

Now, when $B_1 = B_2$, equation (6) becomes: (7) $dB_1 = -dB_2$. Furthermore, from equations (2) and (3), when $B_1 = B_2$, $P_1 = P_2$, and $$\frac{d(1 - P_1)}{dB_1} = \frac{d(1 - P_2)}{dB_2}.$$

therefore, equation (5) becomes: (8) $dT = 0$. Thus, when $B_1 = B_2$, an extremum of transmittance T exists. To ensure that this extremum is a maximum, one performs the second differentiation and makes the appropriate substitutions for $B_1 = B_2$, $dB_1 = -dB_2$, $P_1 = P_2$, $dp_1/dB_1 = dP_2/dB_2$, $d^2P_1/dB_1^2 = d^2P_2/dB_2^2$ to obtain: (9) $d^2T = -2(dP_1/dB_1)^2 (dB_1)^2 -2(1 -P_1) (d^2P_1/dB_1^2) (dB_1)^2$. Therefore, T is maximized if and only if: (10) $(dP_1/dB_1)^2 + (1 -P_1) (d^2P_1/dB_1^2) > 0$.

Since the curve defined by equation (2) is concave upward for every $B_1$ value, equation (10) prevails and therefore each prism 78 should be constructed such that the angle of incidence $B_1$ with the solar ray at the front face 74 equals the angle of incidence $B_2$ with the solar ray at the back face 80 to achieve the highest transmittance T allowed by the laws of physical optics. This is the basic principle for defining the individual prisms in the new lens.

As shown in FIG. 9, the beam of sunlight for a particular prism is diagrammatically shown by dashed lines 86 and 88 which define the width of a single beam which passes through a single prism 78. As best illustrated in FIG. 9, it can be seen that the bottom face 82 of prism 78 is preferably extended beyond the path of the light within prism 78 defined by line 88 but short of the path of the light passing out of the adjacent prism $78_2$ defined by line 86'. It should be readily apparent that no light passes through the triangular area defined by points $(X_4, Y_4)$, $(X_5, Y_5)$ and $(X_6, Y_6)$ (FIG. 9) and therefore no light passes through the bottom face 82 or through the tip 94 formed between faces 80 and 82.

Point $(X_5, Y_5)$ defined by the equations as the intersection between back face 80 and bottom face 82 of the outermost prism 78 is only a construction point because in practice the intersection will form a rounded tip 94.

Tip 94 is rounded because the molded material usually used to form lens 22 such as glass or acrylic has a surface tension which causes the tip to round off in the molding process. It is necessary to compensate for this phenomenon by the over extension of the bottom face 82 of the prism 78 to prevent any light from intersecting the rounded tip 94 which would cause undue loss of light transmittance. In addition, the over extension of bottom face 82 aids in reducing the effect of errors which occur in aiming the lens and manufacturing same. The angles in FIG. 9 are exaggerated for clarity, and the drawing is not to scale; thus, rays 86 and 86' would intersect at the focal plane, although not clearly indicated in FIG. 9.

Figure 10:
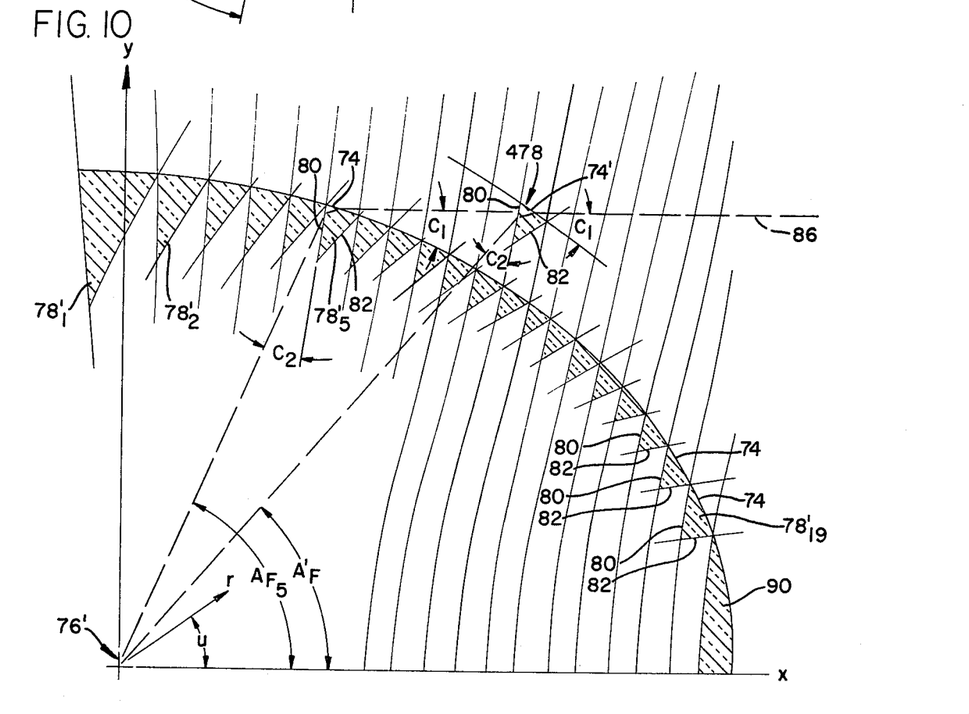
FIG. 10 is a graph diagrammatically illustrating an end view of the lens constructed by polar coordinates.

One method of defining the orientation of the front face 74 and back face 80 and bottom face 82 of prisms 78 which comprise the lens 22 is best illustrated in FIG. 10. This method utilizes equations in polar coordinates to define surfaces 74, 80 and 82 in the upper quadrants of a standard X-Y coordinate system. The focal point 76' of the lens 22 is positioned at the origin of the X-Y coordinate system.

The front face 74 is defined as follows: Define $d = (n^2 + 8)^{1/2}/2 - n/2$. Then $$\frac{r}{r_o} = \left[\frac{(d + 2)}{(d + 2\cos\frac{u}{2})}\right]^{\frac{4}{(d^2+2)}} \left[\frac{(1 - d)}{(1 - d\cos\frac{u}{2})}\right]^{\frac{2d^2}{(d^2+2)}}$$

defines the front face 74 curves, wherein $r_o$ is an arbitrary constant of integration.

The back face 80 of the prism 78 is defined as follows:

$$\frac{r}{r_1} = \left[\frac{(n - 1)}{(n\cos\frac{u}{2} - 1)}\right]^2$$

defines the back surface curves, wherein $r_1$ is an arbitrary constant of integration.

The bottom face 82 of prism 78 is preferably three-fourths of the turning angle $A_F$ which may be expressed as:

$$\frac{r}{r_2} = \left[\frac{1}{\sin(\frac{u}{4})}\right]^4,$$

wherein $r_2$ is an arbitrary constant of integration.

The three formulas indicated above representing the curves defining the front face 74, back face 80, and bottom face 82, were derived by writing and subsequently solving the governing differential equations corresponding to Snell's law of light refraction subject to the constraints that the incidence angles $B_1$ and $B_2$ at the front face 74 and the back face 80 of each prism 78 are equal and that the bottom face 82 of the prism is properly over extended. Each of these differential equations has been derived and solved analytically by the inventor and represented by the integral solution curves illustrated in FIG. 10. It should be readily apparent that an infinite number of curves may be developed depending upon the constants of integration desired. Thus, prisms of any desired size and location may be defined by the above formulas. For example, prism 478 represents such a prism. However, it is desirable that the prisms comprising the lens do not block or shade one another. Therefore, the prisms should be selected along a common outer surface curve 74. With this configuration, each prism has maximum transmittance with no blocking or shading by other prisms. Thus, such a lens will have a higher transmittance than any other lens of the same size, focal length and material composition.

Each prism $78'_1$ - $78'_{19}$ represents the intersection of these curves defined by the equations hereinbefore given.

It should be readily apparent that by varying the distances between the curves which are controlled by the arbitrary constants of integration $r_o$ and $r_1$ and $r_2$ that the size and shape of each prism $78'$ may be varied.

In addition in general practice it would be desirable to use only a portion of the prisms generated by these curves such that a truncated form of the lens would be formed.

In addition, as illustrated in FIG. 10 a ray of light diagrammatically illustrated by the dashed line indicated as 86 could pass through either of the prisms $78'_5$ or 478. Turning angle $A_{F_5}$ is different from the turning angle $A'_F$ of each deflected ray as it passes through either of the representative prisms 478 and 78'$_5$. However, it should be readily apparent that either prism 478 or 78'$_5$ bends the ray through a desired turning angle $A_F$ and each angle of incidence $B_1$ with either front face 74 or 74' is equal to the angle of incidence $B_2$ with the rear face 80 of either prism 478 and 78'$_5$.

Utilizing the standard coordinate transformation of $X = r \cos u$ and $Y = r \sin u$, the curve is plotted on the X-Y coordinate system in which the X-axis is parallel to the incoming light. As illustrated, there are an infinite number of curves which define faces 74, 80, and 82 for different integration constants $r_o$, $r_1$, and $r_2$ from the formulas. Each of the light rays will be turned toward the focal area 76' corresponding with the intersection of the X-Y axes. This orientation of each prism 78 results in equal angles of incidence at the front face 74 and the back face 80 thereby ensuring a maximum transmittance for the lens 22.

The bottom face 82 of the prism 78 is best positioned at an angle relative to the Y-axis equal to $3/4 A_F$. Although FIG. 10 only illustrates the upper quandrants, the lower half of the lens 22 is a mirror image of the upper half, assuming the x axis passes between the upper half and lower half. Therefore, it is unnecessary to further compute the curves necessary to define the lens.

As another method of defining the lens 22, the sequence of formulas set out in Table 6 defines each individual prism 78 in rectangular coordinates. The sequence of formulas in Table 7 defines a method of constructing an entire lens 22 as is illustrated in FIG. 8 of the drawings. Each formula defines a series of points along the cross-section which are connected to define the lens 22.

Both methods of defining the lens are equally valid for point-focussing lenses or line-focussing lenses. For line-focussing lenses, the variable Y used above is a standard rectangular coordinate. For point-focussing lenses, the variable Y is a radial coordinate in an axisymmetric lens. The cross sections of the linear and point-focussing lenses will be identical, and the calculation sequence identical for both.

TABLE 6

1. $(x_1, Y_1)$ is the point chosen to define the desired prism location.
2. $l$ is set equal to the desired slant hight of the prism.
3. $t$ is set equal to the desired slant base thickness of the prism.
4. $a$ is calculated as the root of the following implicit equation:

$$\sin\left[\tan^{-1}\left(\frac{y_1 - \frac{l}{2}\cos[a - \sin^{-1}(n\sin\frac{a}{2})]}{x_1 - \frac{l}{2}\sin[a - \sin^{-1}(n\sin\frac{a}{2})]}\right) + a - \sin^{-1}\left(n\sin\frac{a}{2}\right)\right] = n\sin\frac{a}{2}$$

5. $v$ is calculated as: $v = \sin^{-1}[n\sin\frac{a}{2}] - \frac{a}{2}$

6. $A_F$ is calculated as: $A_F =$ $$\tan^{-1}\left(\frac{y_1 - \frac{l}{2}\cos(\frac{a}{2} - v)}{x_1 - \frac{l}{2}\sin(\frac{a}{2} - v)}\right)$$

7. B is calculated as: $B = a/2 + v$
8. $n$ is the index of refraction of the prism material.

These coordinates, distances and angles totally define the prism configuration, location, and orientation.

It should be appreciated that no light passes through the portion of the prism forming a triangle with vertices $(x_4, y_4)$, $(x_5, y_5)$, and $(x_6, y_6)$. Therefore there are no optical transmittance losses due to light impinging on the bottom face of the prism or due to light hitting the prism point $(x_5, y_5)$.

TABLE 7

1. Choose a desired focal length for the lens, $f$.
2. Choose a desired lens width (for line - focus lens) or diameter (for point-focus lens), $w$.
3. For outermost prism, set $x_1 = f$, and set $y_1 = w/2$.
4. Calculate the outermost prism design for this $(x_1, y_1)$ according to the procedure of Table 6.
5. After completing this outermost prism design, calculate the next prism design by using the point $(x_4, y_4)$ in place of $(x_1, y_1)$ in the calculation sequence of Table 6.
6. After the second prism 78$_2$ design has been calculated, (FIG. 8) point $(x_{10}, y_{10})$ will be known. Calculate the third prism design by using the point $(x_{10}, y_{10})$ in place of $(x_1, y_1)$ in the calculation sequence of Table 6.
7. Continue calculating the lens design prism by prism until the optical axis is reached. If desired, a simple bi-convex lens can be used in place of the last few prisms near the optical axis, as shown in FIG. 8.
8. The lens design below the optical axis is the exact mirror image of the lens design above the optical axis.
9. Refer to FIG. 9. The convex outer surface of the lens is made up of straight line segments such as the line from $(x_2, y_2)$ to $(x_3, y_3)$. However, the performance of the lens is not adversely affected but in fact improved if a smooth curve is faired through these straight line segments to provide the smooth, continuous convex outer lens surface, such as that presented in FIG. 8. In practice, the prisms are so small that it is nearly impossible to distinguish between the pieced-together line segments and a continuous curve.
10. This lens design definition is valid for any reasonable focal length and lens width, and is equally suitable for linear Fresnel lenses and circular Fresnel lenses.

Utilizing Tables 6 and 7, one calculates each point by going through the computations in Table 6 and utilizing trigonometric functions to locate each point of intersection of the lens. As illustrated in FIGS. 8 and 9, each point of the lens 22 is mathematically constructed up to the X-axis. As explained heretofore, a double convex lens 90 may be formed in the center of lens 22 perpendicular to X-axis.

The lens material preferably comprises a material such as methyl methacrylate, commonly known as acrylic plastic having an index of refraction of approximately 1.491. This material is available in exterior grades and is sold under such registered trademarks, as Lucite manufactured by E. I. DuPont de Nemours of Wilmington, Delaware of Plexiglas by Rohm and Hass Company of Philadelphia, Pennsylvania and other companies. Other materials which might be used to construct this lens would be polystyrene having an index of refraction of 1.590 or polycarbonate having an index of refraction of 1.586 or methacrylate styrene copolymer sold under the tradename NAS. These materials may be extruded from a die using conventional molding methods to produce the lens in a linear from or the material may be calendered and bent to the desired curved surface under conventional method of manufacture well known in the art. The desired widths of lens 22 would be subject to various factors but may be in a range anywhere from about 1 to 4 feet (30 - 120cm.) and F-numbers anywhere from about .2 to 1. For the Fresnel lens collector 20 to operate effeciently throughout the daylight hours, it will generally be ncessary to track the sun's apparent motion across the sky, thereby keeping the lens always pointing in the general direction of the sun. It is well known in the art that the sun's apparent motion is characterized by a diurnal motion from East to West during the day at a rate of about 15° per hour. This motion can be tracked by a collector mounted on a polar axis, that is an axis parallel to the Earth's axis of rotation. Such an axis is located by a North-South line tilted toward the equator by the local latitude angle. The new collector can be mounted to rotate about such a polar axis, and an automatic guiding system will keep the lens sun-oriented at all times. In addition to this diurnal motion, the sun undergoes a seasonal variation in declination angle, that is the angle that the sun's rays make with a polar axis. This variation is relatively small, as well known in the art, and amounts to about a plus or minus 23.5° variation about zero. Thus at equinox, the declination angle is zero, and polar tracking will keep the lens always aligned properly. However, at summer solstice, the declination angle is plus 23.5°, and the polar tracking will keep the lens aimed always 23.5° below the sun. Further, at winter solstice, a polar tracking system will keep the lens always aimed 23.5° above the sun since the declination angle is minus 23.5° at that time. Between the equinoxes and the solstices, the declination angle varies between zero and plus or minus 23.5°. These motions are well known in the art. There are three tracking schemes which appear best for the new collector depending upon the application requirements. The simplest is to merely track about a polar axis with no correction for declination angle changes. To do so, the receiver must be oversized from its normal small size to compensate for the changing focal location due to the change in declination angle. For such a tracking system, the receiver will be placed slightly above its normal location, that is closer to the lens, such that it is a minimum size for the entire yearly swing in declination angle. A second tracking method is to use two-directional tracking, with a correction for the declination angle changes which occur seasonally. This can be accomplished by adding a second automatic drive system to vary the tilt of the collector toward the South to always aim directly at the sun. This system will of course be more complex and more expensive than simple polar tracking. A third tracking method which is preferred if high concentration levels are required is to use simple polar tracking combined with a manual or automatic adjustment of receiver location within the collector. In this system, at equinox the receiver will be located at the true focus of the lens. At solstice, since the declination angle is plus or minus 23.5°, the apparent focal length of the lens will be reduced from its normal value of F to the value F cos 23.5°, or 0.917 F. If the receiver is adjusted to be at 0.917 F relative to the lens, near-perfect focussing will occur all day. Thus, this third and preferred tracking system will vary the receiver position within the collector to maintain it at F cos D, wherein D is the declination angle. Since the declination angle varies slowly, daily or even weekly corrections of receiver position will suffice to provide highly accurate focussing. Thus, manual adjustment or automatic adjustment means for receiver location could be provided without much additional cost. This tracking method will provide concentrations equivalent to two-directional tracking.

Many types of tracking systems are available and are generally well-known in the art. As diagrammatically illustrated in FIG. 2, such a system may comprise a motor 94 drivingly connected by the chain 96 to a sprocket 98 on the collector 20. The collector 20 may be supported by bearings not shown secured to stub shafts 97. The collector 20 may have a light sensing means 100 comprising two silicon light cells set on a base approximately 60° angle to one another facing the sun. When one cell receives more light than the other, a circuit provided by control means 102 would become unbalanced to energize motor 94 to rotate the collector 20 until the circuit has again become balanced.

Figure 13:
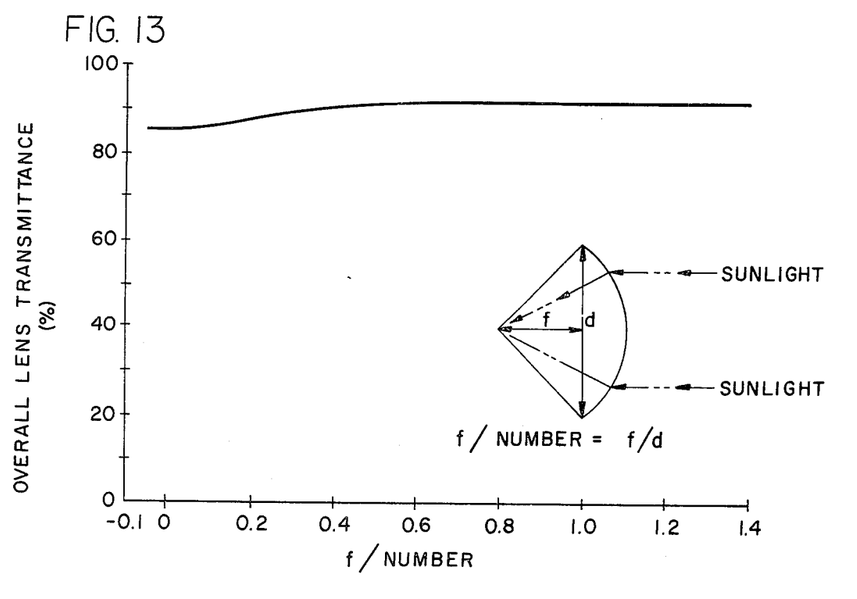
FIG. 13 is a graph illustrating the overall transmittance of light through the lens for various F-numbers of the new lens.

FIG. 13 illustrates a graph showing the percentage of transmittance for various F-numbers of lens 22 composed of a material such as acrylic plastic. It should be recognized that a lens having an F-number of 0.3 has about 90% transmittance and this increases with increasing F-number to about 92.4%. No other prismatic lens made of the same material can equal or exceed this transmittance curve. Thus the new lens offers the highest possible performance together with small focal length. Therefore, compact, economical and efficient solar collectors can be made with the new lens.

Figure 14:
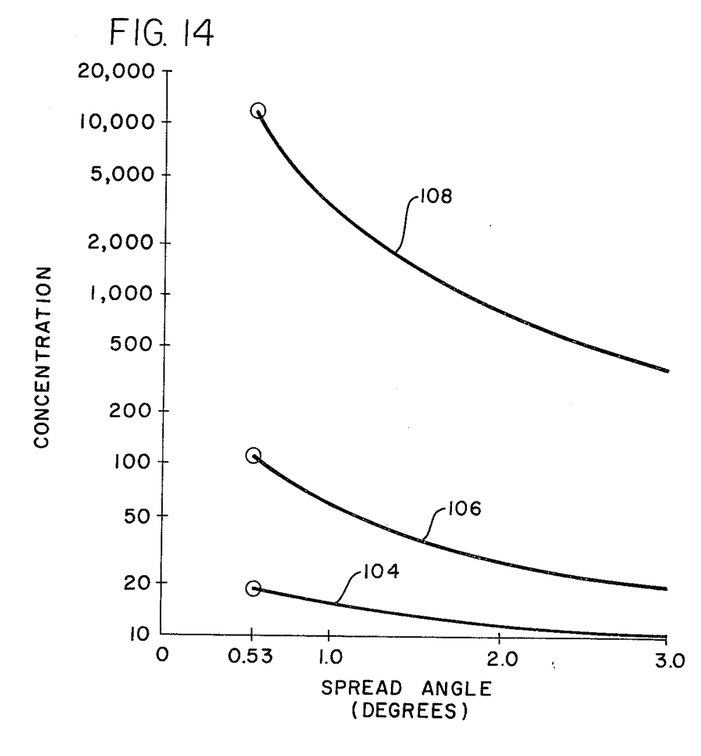
FIG. 14 is a graph illustrating the concentration of light in sun's versus the spread angle of the light for the new lens with an F-number of 0.5, for three different solar collectors.

FIG. 14 is a graph illustrating the concentration of light versus spread angle for different lenses of the new design. Line 104 shows a linear lens with one direction polar tracking, line 106 shows a linear lens with two direction tracking and line 108 shows a point-focus lens 122 with two direction tracking. Concentration is herein defined as the ratio of lens aperture area divided by receiver area. All of the lens embodiments for FIG. 14 have F-numbers of 0.5, a preferred value for achieving high concentration levels.

As well known in the art, the spread angle illustrated in FIG. 14 includes the solar disc angular diameter, which is known to be 0.53°, lens fabrication errors, chromatic aberration, and tracking errors. A spread angle of 2° is probable for acrylic plastic and an F-number of ½. Thus, concentrations of about 800 suns, 30 suns and 13 suns should be achieveable for the three lens embodiments which are plotted on the graph in FIG. 14. If errors were all zero and a non-dispersive material were used in making the lens, these theoretical concentrations would be about 11,600 suns, 108 suns and 18 suns respectively for a spread angle of 0.53°.

As heretofore described, a tracking device may be used to compensate for changes in the sun's position which varies with time of day and with the seasons of the year.

A linear collector 20 as illustrated in FIG. 1 which uses one direction tracking from East to West is capable of developing temperatures of over 500° F (260°) which is more than adequate to provide heat energy for heating, air-conditioning and similar uses.

MODIFIED FORM

Figure 11:
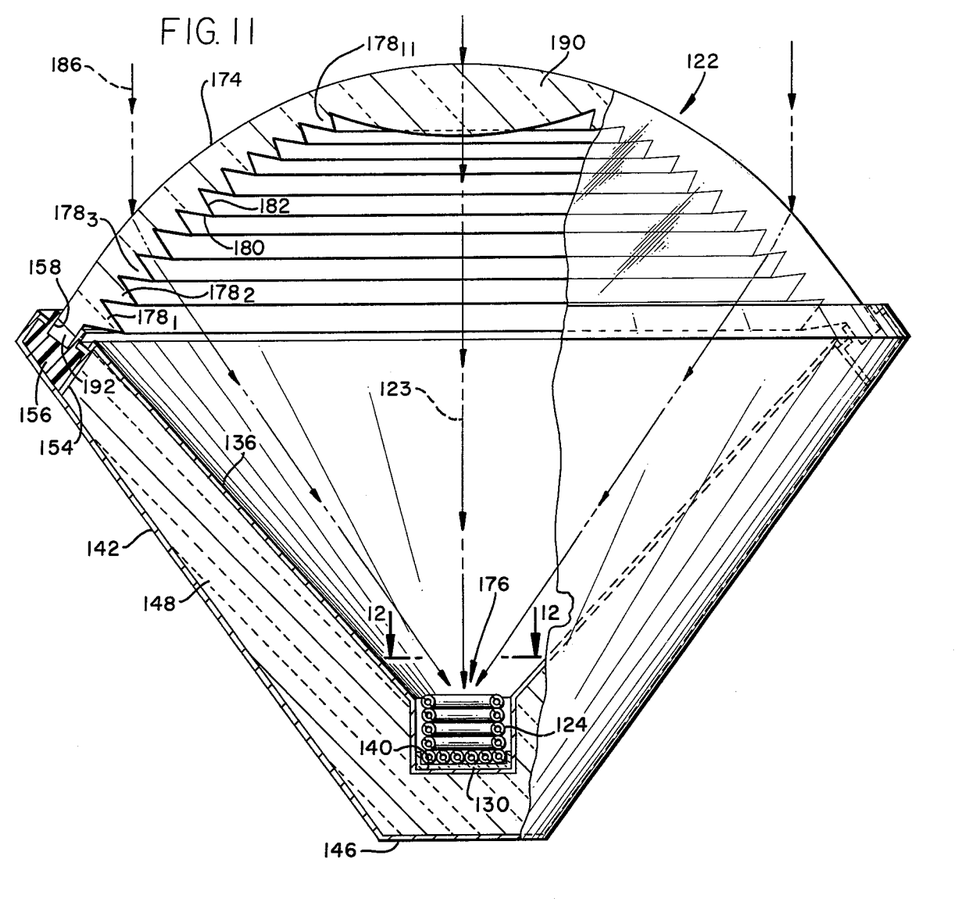
FIG. 11 is an elevational view of a modified form of the collector with parts broken away to more clearly illustrate the details of construction.
Figure 12:
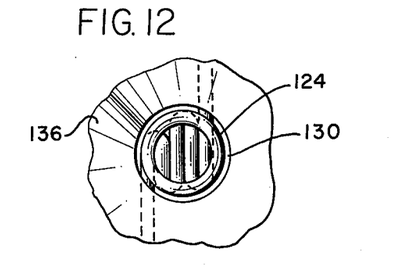
FIG. 12 is a cross-sectional view taken along line 12—12 of FIG. 11.

It is generally necessary to use a point focussing lens for developing high temperatures of around 1,000° F (538° C). As illustrated in FIGS. 11 and 12, the point focusing lens 122 is used with circular cone shaped housing having circular sidewalls 142 and bottom 146. The lens 122 has an end 192 disposed in slot 158 of rubber gasket 156. The annular gasket 156 is disposed in the annular channel 154 formed between the outer housing 142 and inner housing 136 on top thereof. The inner housing 136 has an inner bottom 140 formed adjacent the focal area 176 of the lens 122. Insulation 148 is located within the space formed between the inner housing 136 and outer housing 142. Lens 122 is constructed similarly to the longitudinal lens 22 except the lens is formed with annular prisms $178_1$ - $178_{11}$ having a double convex lens 190 formed in the center perpendicualr to the axis 123 of the lens 122. Each of the prisms 178 has a front face 174 and a back face 180 joined by a bottom face 182. The lens 122 concentrates the light causing equal angles of incidence $B_1(90°-C_1)$ and $B_2(90°-C_2)$ with front face 174 and back face 180 as light passes therethrough and concentrates the light in a common area generally designated 176. This area 176 has a heat absorber means comprising a coiled, steel pipe 124 through which a heat transfer medium is passed to absorb the heat. This type of absorber is generally known as a cavity boiler in which the light is concentrated to about 1,000 suns intensity thereby producing temperatures of over 1,000° F. The cavity boiler is generally spaced from the inner housing 136 by a ceramic disc 130.

A higher temperature achieved by lens 122 is used to drive solar energy engines to produce electricity. This type of lens 122 is generally used with two directional tracking system to achieve an average concentration of 300 – 1500 suns with an F-number of 0.5.

Figure 4:
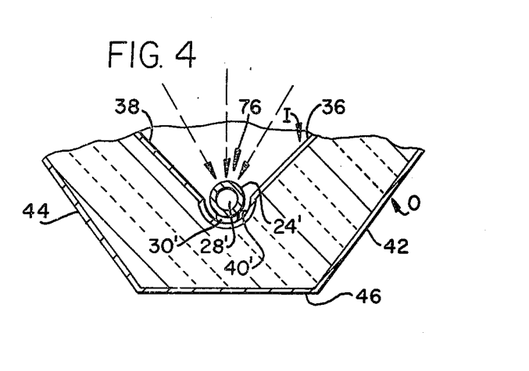
FIG. 4 is an enlarged cross-sectional view of a first modified form of the energy receiver illustrated in FIG. 3.

Modified forms of energy receiving means for the linear collector 20 are illustrated in FIGS. 4–7. As illustrated in FIG. 4, a bare round tube 24' has a passage 28' formed therein through which a heat exchange medium is passed. A spacer 30' is used to space the tube 24' off of the rounded bottom 40'.

The upper surface of tube 24' is generally aligned with the focal area 76 of the lens.

Figure 5:
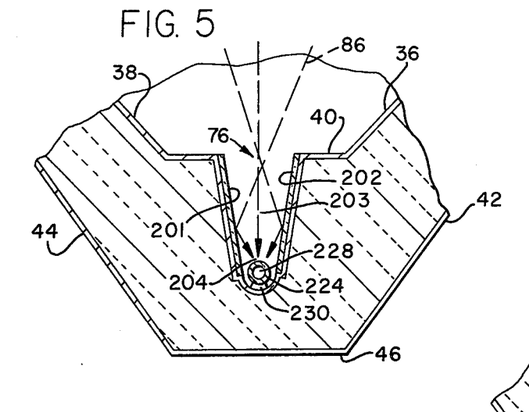
FIG. 5 is an enlarged cross-sectional view of a second modified form thereof.

A second modified form of the energy receiving means is illustrated in FIG. 5, in which a pair of straight or curved mirrors 201 and 202 are angularly spaced from each other such that the upper edges of the mirrors 201 and 202 are aligned in a horizontal plane of the focal area 76 of the lens. Mirrors 201 and 202 form a channel 203 which extends longitudinally within the collector 20 such that the light is reflected by the mirrors downwardly to a narrow, circular groove 204 formed at the bottom of the collector 20. A very small metallic tube 224 supported by spacers 230 is aligned in the longitudinal groove 204 such that the light is reflected onto the surface of the tube 224 to heat the heat exchange medium which passes through the passage 228 contained therein.

Figure 6:
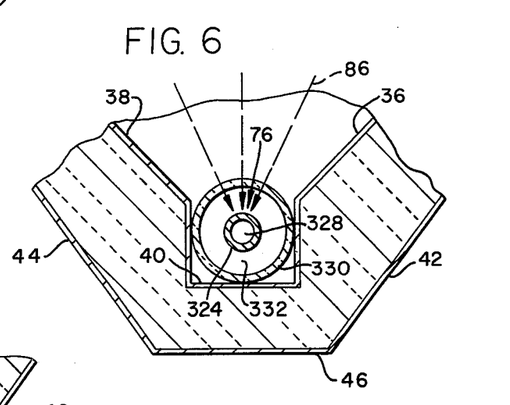
FIG. 6 is an enlarged cross-sectional view of a third modified form thereof.

The third embodiment of the heat exchange means is illustrated in FIG. 6, which generally does not require insulation unless so desired. The energy receiving means comprises a hollow tube 324 having a passage 328 which is spaced from the transparent tube 330 constructed of glass, acrylic or the like forming an annular spaced 332 therebetween. Tube 324 is spaced from the lens along the axis thereof such that the light rays 86 are focused in the area 76 on the surface of tube 324. If desired a vacuum may be drawn on the annular space 332 thereby reducing heat losses from tube 324 and improving collector efficiency.

Figure 7:
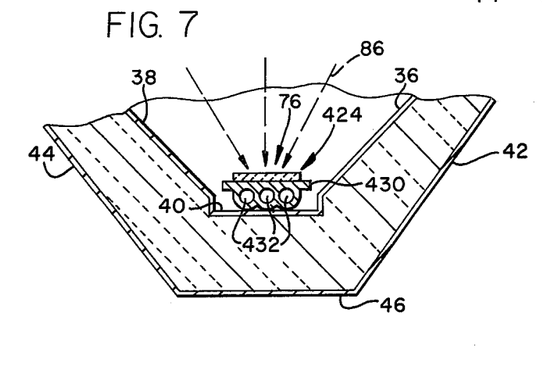
FIG. 7 is an enlarged cross-sectional view of a fourth modified form thereof.

A fourth embodiment is illustrated in FIG. 7 in which a photovoltaic cell 424 is constructed longitudinally along the focal area 76 of the lens such that the light strikes a cell 424 in a concentrated area. The cell 424 is secured to a metal heat exchanger 430 having passages 432 formed therein such that the cooling means may be passed therethrough to keep photovoltaic cell 424 from overheating and to provide heated fluid for other uses. Various types of suitable cells are available for use. The cell generally comprises a semi-conductor material such as cadmium sulfide cells or silicon cells. Such photovoltaic cells produce electricity directly from the concentrated sunlight, said electricity being useable for powering conventional equipment. Since photovoltaic cells are currently expensive, their use within the new collector offers economic advantages, since only a small area of cells is required for a large area of collector lens aperture.

Having described my invention, I claim:

1. A radiant energy concentrator comprising: a prismatic lens having a plurality of prisms arranged to direct incoming light to a common focal area, each of the prisms having a front face, a back face, and a bottom face which joins the front and back faces, each prism further having the front and back faces of the prism oriented such that the angle of incidence of the light passing through the front face is equal to the angle of incidence of the light passing through the back face; an energy receiving means spaced from said prismatic lens, said energy receiving means coinciding with the focal area of said prismatic lens; and support means for supporting said prismatic lens, and energy receiving means.

2. The combination called for in claim 1 wherein the energy receiving means comprises a tube, said tube having a passage formed therethrough such that a fluid may flow therethrough.

3. The combination called for in claim 2 with the addition of: a transparent tube concentrically arranged about the tube and spaced therefrom.

4. The combination called for in claim 3 wherein a vacuum is formed between the transparent tube and the tube to insulate the tube.

5. The combination called for in claim 1 wherein the energy receiving means comprises a photovoltaic cell; and means to cool said cell.

6. The combination called for in claim 1 wherein the prisms of the lens are arranged along a curved surface, each prism being arranged so as not to obstruct light passing through the adjacent prism.

7. The combination called for in claim 1 wherein the bottom face of each prism over extends outwardly between a position beyond the path of the rays of light passing within the prism to a position less than the path of the rays of light passing out of the adjacent prism.

8. The combination called for in claim 1 wherein the prisms are arranged to focus the light along the longitudinal length of the energy receiving means.

9. The combination called for in claim 1 wherein the prisms are arranged to focus the light on a single spot on the energy receiving means.

10. A solar energy collector comprising a support means having an opening formed in the upper end thereof, said support means adapted to support the collector; an energy receiving means positioned in the lower portion of the interior of said support means; a curved prismatic lens spaced from said energy receiving means, said lens being secured to the upper end of said support means, said lens comprising a plurality of prisms arranged to direct light to a common focal area, each prism having a front face which forms the outer surface of the lens, a back face and a bottom face which form the interior surface of the lens, the improvement comprising: the front and back faces of each prism being oriented such that the angle of incidence of the light passing through the front face is equal to the angle of incidence of light passing through the back face.

11. The combination called for in claim 10 wherein the prisms of the lens are arranged along a curved surface, each prism being arranged so as not to obstruct light passing through the adjacent prism.

12. The combination called for in claim 10 wherein the bottom face of each prism extends outwardly between a position beyond the path of rays of light passing within the prism to a position less than the path of the rays of light passing out of the adjacent prism.

13. The combination called for in claim 10 wherein the support means and lens are linear and adapted to focus light along a longitudinal area parallel to the longitudinal axis of the lens.

14. The combination called for in claim 10 wherein the lens is spherical and the support means is rounded to focus light in a common spot on the energy receiving means.

15. A Fresnel prismatic lens comprising: a plurality of prisms arranged to direct light to a common area, each of the prisms having a front face, a back face, and a bottom face which joins the front and back faces, each prism further having the front and back faces of the prism oriented such that the angle of incidence of the light passing through the front face is equal to the angle of incidence of the light passing through the back face.

16. The combination called for in claim 15 wherein the prisms are arranged along a curved surface, each prism being arranged so as not to obstruct light passing through the adjacent prism.

17. The combination called for in claim 15 wherein the bottom face of each prism over extends outwardly between a position beyond the path of the rays of light passing within the prism to a position less than the path of the rays of light passing out of the adjacent prism.

18. The combination called for in claim 16 wherein the bottom face of each prism over extends outwardly between the position beyond the path of the rays of light passing within the prism to a position less than the path of the rays of the light passing out of the adjacent prism.

19. The combination called for in claim 18 wherein the bottom face of the prism is oriented such that the angle between the lens optical axis and the bottom face of the prism is an angle at least greater than one-half the turning angle of the light passing through the prism but less than the full turning angle of the light passing therethrough.

20. The combination called for in claim 15 with the addition of: a support means adapted to support said prismatic lens; and an energy receiving means positioned by said support means and coinciding with the focal point of the prismatic lens such that sunlight is concentrated on the energy receiving means.

21. The combination called for in claim 15 wherein the prisms are arranged to direct light to a common area comprising a line disposed parallel to the longitudinal axis of the lens.

22. The combination called for in claim 15 wherein the prisms are arranged to direct light to a common area comprising a concentrated spot.

23. The combination called for in claim 15 wherein the focal length of the lens is less than the width of the lens such that the F-number of the lens is less than 1.0.

24. A curved Fresnel prismatic lens comprising: a plurality of prisms arranged along a curved surface to direct incoming light to a common focal point, each of the prisms having a front face, a back face, and a bottom face which joins the front and back faces, each prism further having the front and back faces oriented such that the angle of incidence of the light passing through the front face is equal to the angle of incidence of the light passing through the back face, and wherein the bottom face of each prism extends outwardly from a position beyond the path of the rays of light passing within the prism to a position less than the path of the rays of light passing out of the adjacent prism so as not to obstruct any light passing through the prisms.

25. The combination called for in claim 24 wherein the bottom face of the prism is oriented such that the angle between the lens optical axis and the bottom face of the prism is greater than one-half the turning angle of the light passing through the prism but less than the turning angle of the light.

26. The combination called for in claim 2 wherein the prisms are arranged to direct light to a common area comprising a line parallel to the longitudinal axis of the lens.

27. The combination called for in claim 16 wherein the prisms are arranged to direct light to a common area comprising a concentrated spot.

28. The combination called for in claim 17 wherein the prisms are arranged to focus along a line.

29. The combination called for in claim 17 wherein the prisms are arranged to focus on a spot.

30. The combination called for in claim 15 wherein the lens is linear.

31. The combination called for in claim 15 wherein the lens is spherical.

32. The combination called for in claim 15 with the addition of: a support means; and energy receiving means spaced from said lens by said support means such that the light passing through the lens is focused on the energy receiving means.

33. A method of concentrating energy from light rays emitted from a source of energy comprising the steps of: providing a plurality of prisms having a front and back face joined by a bottom face; refracting the light through the front and back faces of the prisms to a common focal area such that the angles of incidence with the rays refracted through the prisms is equal with respect to the front and back faces of the prism.

34. The method called for in claim 33 with the additional steps of: arranging the prisms along the curved surface such that each prism does not obstruct light passing through the adjacent prism.

35. The combination called for in claim 33 with the additional steps of: over-extending the bottom face of each prism beyond the path of the rays passing therewithin.

36. The combination called for in claim 1 with the addition of: means pivotally securing said support means such that the longitudinal axis of said support means is aligned with a polar axis; means to move said support means for diurnal tracking of the sun; means to move the energy receiving means relative to the lens and align said energy receiving means at the sharpest focus of the lens as the sun changes angles of declination relative to the lens.

37. A radiant energy concentrator comprising:
energy receiving means disposed along a receiving axis;
a prismatic lens means comprised of a plurality of juxtaposed prisms arranged to form a generally curvilinear outer surface to direct incoming light to said energy receiving means; and
means for supporting said prismatic lens means relative to said energy receiving means such that said prismatic lens means is disposed from and curved about said energy receiving means, said prismatic lens means being formed in such a manner that the radial distance from the receiving axis to any one of said prisms varies in accordance with the relative position of said one prism within the said prismatic lens means.

38. The energy concentrator as set forth in claim 37 wherein said prismatic lens means is symmetrical relative to a central plane passing through the receiving axis, said radial distance being a function of the angle the central plane makes with a plane passing through the receiving axis and said one of said prisms.

39. The energy concentrator as set forth in claim 38 wherein said radial distance to any one of said prisms decreases as the distance from said one prism to the central plane increases.

40. The energy concentrator as set forth in claim 39 wherein said prism includes a front face, a back face, and a bottom face joining the front and back faces, each prism being formed such that a light ray impinging upon said front face at a given incidence angle will pass through said prism and emerge at substantially the same given angle relative to said back face.

* * * * *